US011038217B2

United States Patent
In et al.

(10) Patent No.: US 11,038,217 B2
(45) Date of Patent: Jun. 15, 2021

(54) BATTERY MODULE

(71) Applicant: HONDA MOTOR CO., LTD., Tokyo (JP)

(72) Inventors: Kazuhisa In, Saitama (JP); Hiroki Itaya, Saitama (JP); Atsushi Nakano, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 161 days.

(21) Appl. No.: 16/432,037

(22) Filed: Jun. 5, 2019

(65) Prior Publication Data
US 2019/0393565 A1    Dec. 26, 2019

(30) Foreign Application Priority Data

Jun. 22, 2018   (JP) .............................. JP2018-119107

(51) Int. Cl.
*H01M 2/24*     (2006.01)
*H01M 10/48*    (2006.01)
*H01M 50/20*    (2021.01)
*H01M 50/502*   (2021.01)

(52) U.S. Cl.
CPC ......... *H01M 10/482* (2013.01); *H01M 50/20* (2021.01); *H01M 50/502* (2021.01); *H01M 2220/20* (2013.01)

(58) Field of Classification Search
CPC .. H01M 10/482; H01M 50/20; H01M 50/502; H01M 2220/20; H01M 10/425; Y02E 60/10
See application file for complete search history.

(56) References Cited

U.S. PATENT DOCUMENTS

| 2011/0097618 A1 | 4/2011 | Hauck et al. |
| 2016/0254515 A1 | 9/2016 | Shimoda et al. |
| 2017/0324225 A1* | 11/2017 | Nakayama ............... H02B 1/20 |

FOREIGN PATENT DOCUMENTS

| JP | 2013-137905 A | 7/2013 |
| JP | 2015-097176 A | 5/2015 |
| JP | 2015-111537 A | 6/2015 |
| JP | 2015-159024 A | 9/2015 |
| JP | 2016-012490 A1 | 1/2016 |
| JP | 2016-072181 A | 5/2016 |
| WO | WO 2014/024434 A1 | 2/2014 |
| WO | WO 2018/055702 A1 | 3/2018 |

OTHER PUBLICATIONS

Feb. 18, 2020, Japanese Office Action issued for related JP Application No. 2018-119107.

* cited by examiner

*Primary Examiner* — Cynthia K Walls
(74) *Attorney, Agent, or Firm* — Paratas Law Group, PLLC

(57) ABSTRACT

A battery module includes: a cell-stacked body constituted by stacking a plurality of cells; and a sensor device configured to detect a voltage of each cell. The sensor device is disposed on an upper portion of the cell-stacked body. The sensor device is provided with a sensor bulging portion which bulges downward, and the upper portion of the cell-stacked body is provided with a low-height portion accommodating the sensor bulging portion.

8 Claims, 5 Drawing Sheets

BATTERY MODULE

CROSS-REFERENCE TO RELATED APPLICATION (S)

This application claims priority from Japanese Patent Application No. 2018-119107 filed on Jun. 22, 2018, the entire contents of which are incorporated herein by reference.

FIELD

The present invention relates to a battery module mounted on an electric vehicle or the like.

BACKGROUND

In a related art, a battery module is mounted on an electric vehicle and the like. For example, JP-A-2016-072181 discloses a battery module including a cell-stacked body constituted by stacking a plurality of cells and a sensor device which detects the voltage of each cell.

However, in the battery module of JP-A-2016-072181, since the sensor device is disposed on an upper portion of the cell-stacked body, there is a concern that a height dimension of the battery module significantly increases.

SUMMARY

The invention provides a battery module capable of restricting a height dimension while a sensor device is disposed on an upper portion of a cell-stacked body.

A battery module according to the invention, includes:
a cell-stacked body constituted by stacking a plurality of cells and
a sensor device configured to detect a voltage of each cell, in which
the sensor device is disposed on an upper portion of the cell-stacked body,
the sensor device is provided with a sensor bulging portion which bulges downward, and
the upper portion of the cell-stacked body is provided with a low-height portion accommodating the sensor bulging portion.

According to the invention, since the sensor device is provided with the sensor bulging portion which bulges downward and the upper portion of the cell-stacked body is provided with the low-height portion accommodating the sensor bulging portion, the height dimension of the battery module can be restricted by a nested structure while the sensor device is disposed on the upper portion of the cell-stacked body in the battery module.

DETAILED DESCRIPTION

Hereinafter, an embodiment of a battery module of the invention will be described based on the accompanying drawings. The drawings should be viewed in the direction of reference signs.

[Battery Module]

Figure 1:
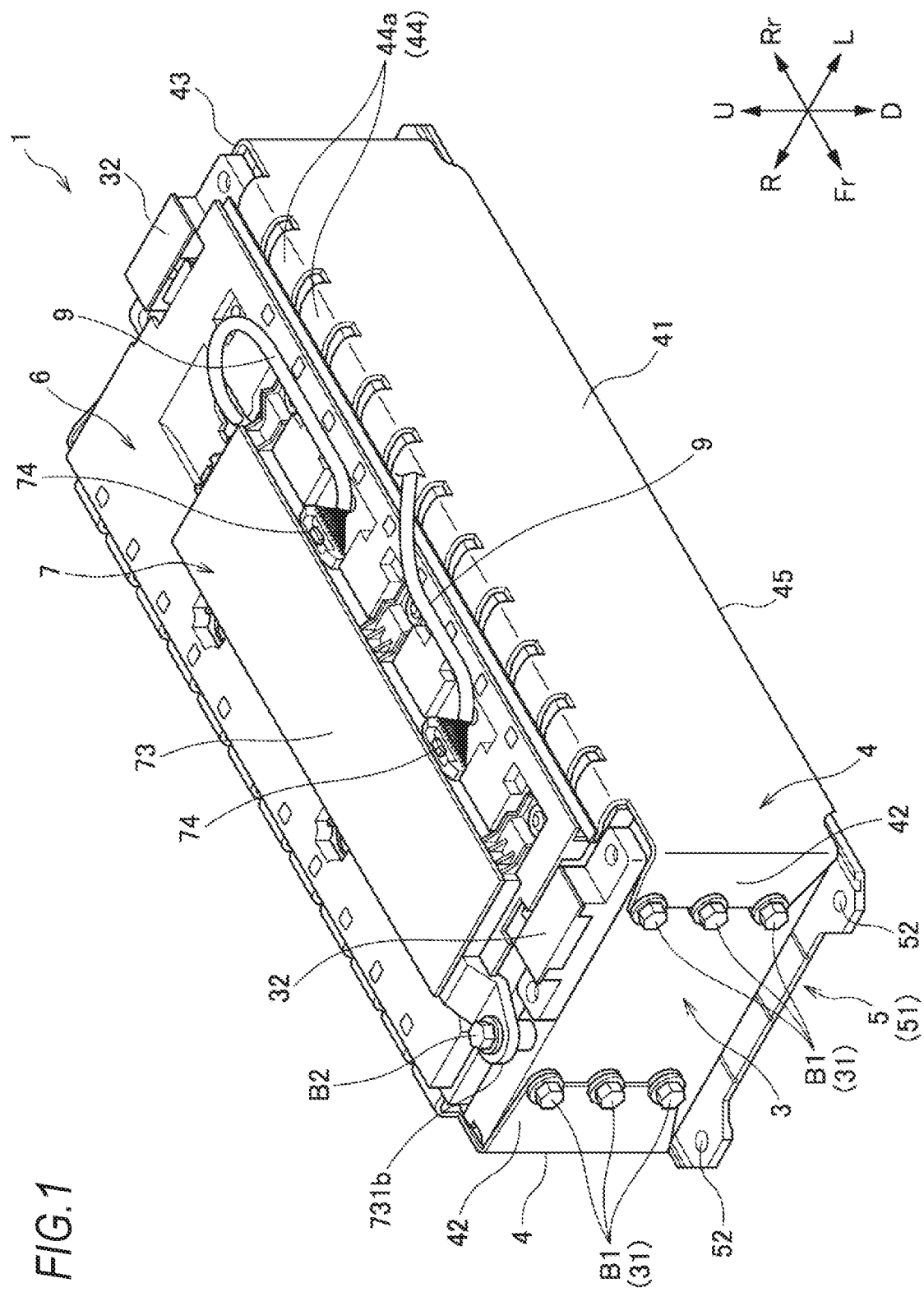
FIG. 1 is a perspective view of a battery module according to an embodiment of the invention as viewed obliquely from above.
Figure 2:
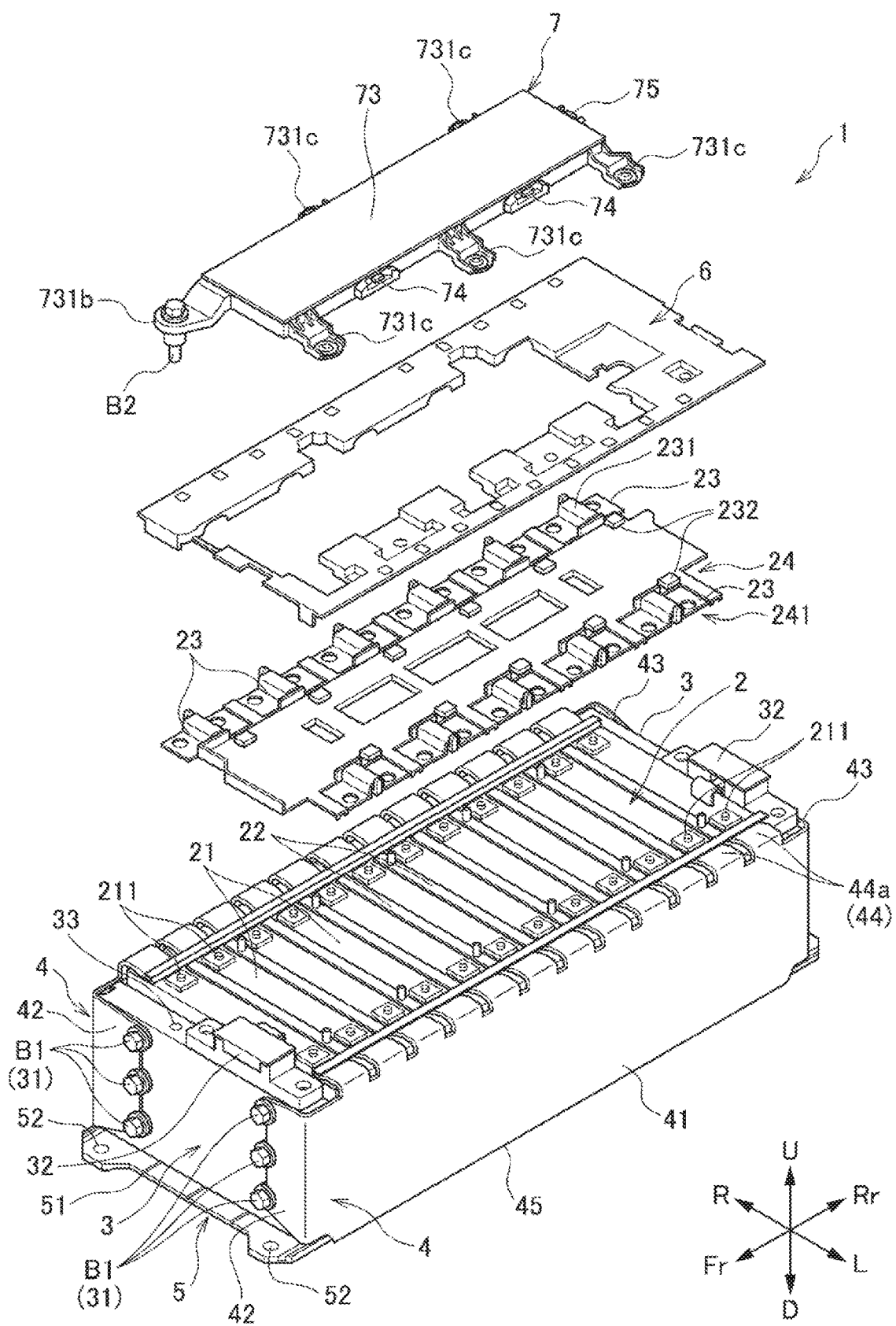
FIG. 2 is an exploded perspective view of the battery module of FIG. 1.
Figure 3:
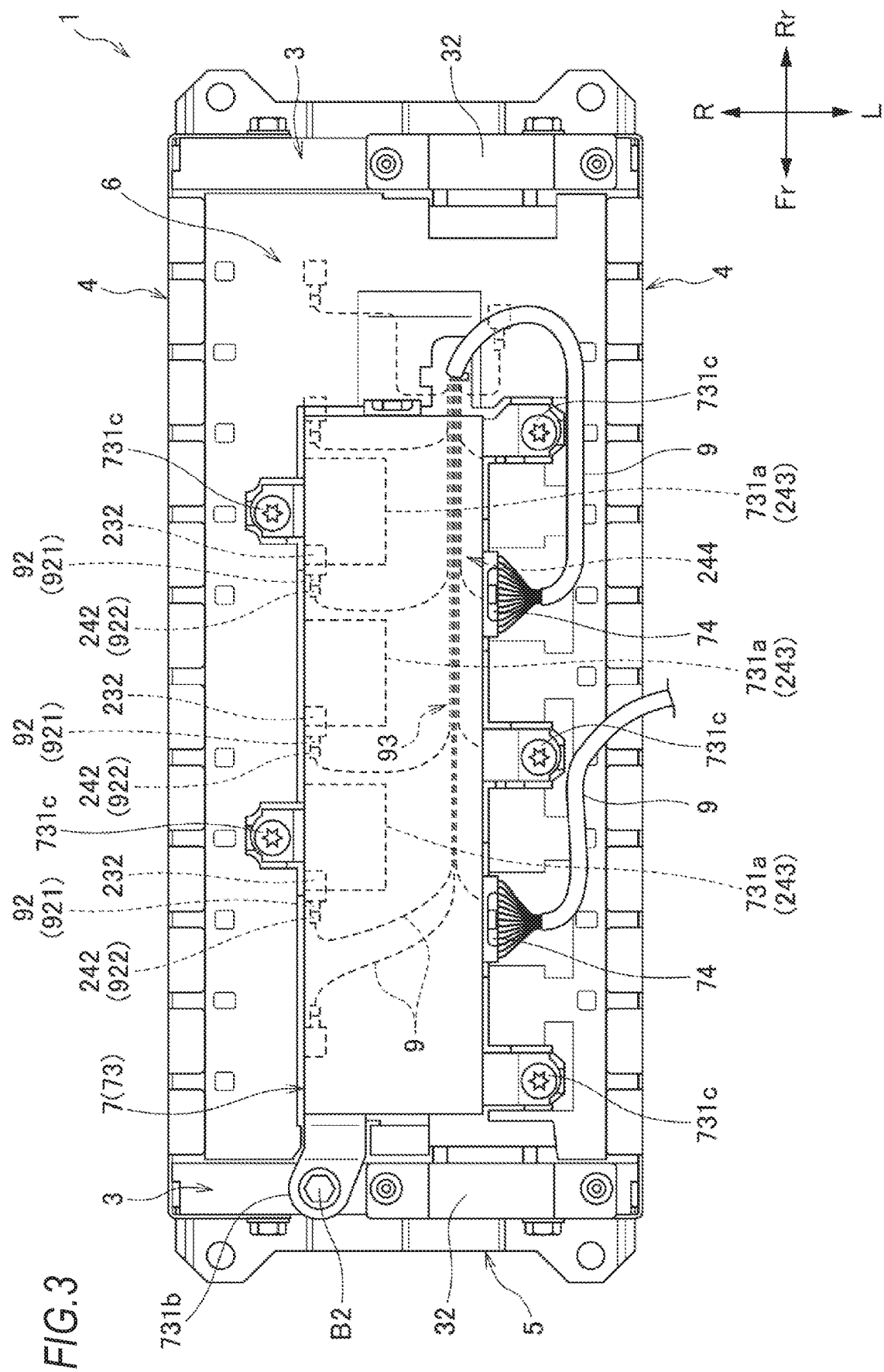
FIG. 3 is a plan view of the battery module of FIG. 1.

As illustrated in FIGS. 1 to 3, a battery module 1 according to the embodiment includes a cell-stacked body 2 configured by stacking a plurality of cells 21 in a front-rear direction and having a front surface, a rear surface, a left surface, a right surface, an upper surface, and a lower surface; a pair of end plates 3 disposed on the front surface and the rear surface of the cell-stacked body 2; a pair of side frames 4 disposed on the left surface and the right surface of the cell-stacked body 2 and connecting the pair of end plates 3; a lower plate 5 disposed on the lower surface of the cell-stacked body 2; a sensor device 7 disposed on the upper surface of the cell-stacked body 2 for detecting the voltage of each cell 21; and a top cover 6 covering a region of the top surface of the cell-stacked body 2 on which the sensor device 7 is not mounted.

In this specification and the like, in order to simplify and clarify the description, a stacking direction of the cells 21 is defined as a front-rear direction and directions perpendicular to the stacking direction of the cells 21 are defined as a right-left direction and an up-down direction and those directions are irrelevant to the front-rear direction and the like of a product on which the battery module 1 is mounted. That is, when the battery module 1 is mounted on a vehicle, the stacking direction of the cells 21 may match the front-rear direction of the vehicle, or may be the up-down direction or the right-left direction of a vehicle, or may be a direction inclined from those directions. In the drawings, the front of the battery module 1 is indicated as Fr, the rear is indicated as Rr, the left side is indicated as L, the right side is indicated as R, the upper side is indicated as U, and the lower side is indicated as D.

(Cell-Stacked Body)

As illustrated in FIG. 2, the cell-stacked body 2 is constituted by alternately stacking a plurality of cells 21 and a plurality of insulation plates 22 in the front-rear direction. A plurality of bus bars 23 electrically connected to terminals 211 of the cells 21 are disposed on the upper surface of the cell-stacked body 2. The plurality of bus bars 23 connect the terminals 211 of the adjacent cells 21 so that the plurality of cells 21 are electrically connected in series. Specifically, the plurality of cells 21 are stacked such that the terminal 211 on a positive side and the terminal 211 on a negative side are sequentially reversed horizontally, and the plurality of bus bars 23 sequentially connect the terminals 211 on the positive side (or negative side) of the cell 21 adjacent to an upper side in the cell stacking direction and the terminals 211 on the negative side (or positive side) of the cell 21 adjacent to a lower side in the cell stacking direction. Accordingly, the plurality of bus bars 23 electrically connect the plurality of cells 21 in series.

A bus bar plate 24 for holding the plurality of bus bars 23 is provided on the upper surface of the cell-stacked body 2. The bus bar plate 24 includes a plurality of bus bar holders 241. When the bus bar plate 24 is placed on the upper surface of the cell-stacked body 2 after holding the plurality of bus bars 23 in the bus bar holders 241, the plurality of bus bars 23 are positioned at predetermined locations connectable to the corresponding terminals 211. Also, the bus bar plate 24 of the embodiment is not a jig which is detached after connecting the bus bars 23 to the terminals 211, but a constituent element of the battery module 1, which maintains a mounted state thereof even after connecting the bus bars 23 to the terminals 211.

The cell 21 is known to expand due to temperature change and aged deterioration. The cell 21 has a rectangular shape in which the length in the up-down direction is longer than that in the front-rear direction and the length in the right-left direction is longer than that in the up-down direction. Therefore, the areas of the front and rear surfaces of the cell 21 are much larger than the areas of the left, right, upper, and lower surfaces, and thus the central portion in the right-left direction and the central portion in the up-down direction of the front and rear surfaces of the cell 21 easily expand. When the cell 21 expands in the front-rear direction, stress acts on the bus bar 23 connecting the terminals 211 of the cells 21 to each other. The bus bar 23 of the embodiment has a bent portion 231 protruding upward at the middle portion in the front-rear direction in order to relieve the stress acting as the cell 21 expands.

(End Plate)

As illustrated in FIGS. 1 to 3, the pair of end plates 3 are arranged along the front surface and the rear surface of the cell-stacked body 2 and receive a load of the cell-stacked body 2 in the cell stacking direction due to the expansion of the cell 21. The end plate 3 of the embodiment is formed using an aluminum extrusion material and a plurality of fastening portions 31 to be fastened to side frames 4 with bolts B1 are provided at the left and right end portions of an outer surface not facing the cell-stacked body 2. In addition, on the upper surface of the pair of end plates 3, there are provided external connection terminal bases 32 for transferring and receiving power between the battery module 1 and an external electric device, and further a sensor fixing portion 33 to which the sensor device 7 is fixed via a bolt B2 is provided on the upper surface of one of the end plates 3.

(Side Frame)

As illustrated in FIGS. 1 to 3, the side frame 4 are formed by pressing a metal plate material and includes side frame main bodies 41 along the left or right surface of the cell-stacked body 2, front flange portions 42 extending from front ends of the side frame main bodies 41 in a direction approaching each other along the front surface of the end plate 3 on the front side, rear flange portions 43 extending from rear ends of the side frame main bodies 41 in a direction approaching each other along the rear surface of the end plate 3 on the rear side, upper flange portions 44 extending from upper ends of the side frame main bodies 41 in a direction approaching each other along the upper surface of the cell-stacked body 2, and lower flange portions 45 extending from lower ends of the side frame main bodies 41 in a direction approaching each other along the lower surface of the cell-stacked body 2 (lower plate 5).

The front flange portions 42 and the rear flange portions 43 are fastened to the end plate 3 on the front side and the end plate 3 on the rear side through the bolts B1. Therefore, the pair of end plates 3 are connected via the pair of side frames 4. The pair of side frames 4 allow relative displacement in the front-rear direction of the end plates 3 when the load of the cell-stacked body 2 in the cell stacking direction increases. For example, the relative displacement of the end plates 3 in the front-rear direction is allowed by the deformation of the side frame main bodies 41 in the front-rear direction, the angle change of the side frame main bodies 41 and the front flange portions 42 or the rear flange portions 43, and the like.

The upper flange portions 44 and the lower flange portions 45 vertically pinch the cell-stacked body 2 and the lower plate 5 at the left end portion and the right end portion of the cell-stacked body 2. Therefore, the relative positional fluctuation of the cell-stacked body 2, the side frames 4, and the lower plate 5 in the up-down direction is restricted and the plurality of cells 21 constituting the cell-stacked body 2 can be aligned.

The upper flange portion 44 of the embodiment is constituted of a plurality of elastic pieces 44a aligned in the front-rear direction and the number and positions of the elastic pieces 44a correspond to the number and positions of the cells 21 stacked in the front-rear direction. As a result, the upper flange portion 44 can elastically hold the plurality of cells 21 individually with appropriate elasticity. The lower flange portion 45 is fixed to or engaged with the lower plate 5 via fastened portions (not illustrated).

(Lower Plate)

As illustrated in FIGS. 1 and 2, the lower plate 5 is formed using an aluminum extrusion material and includes a lower plate main body 51 extending along the lower surfaces of the cell-stacked body 2 and end plates 3, a plurality of fixing portions 52 to be fixed to a module support structure (not illustrated) supporting the battery module 1, and fastening portions (not illustrated) to which the lower flange portions 45 of the side frames 4 are fastened.

(Sensor Device)

Figure 4:
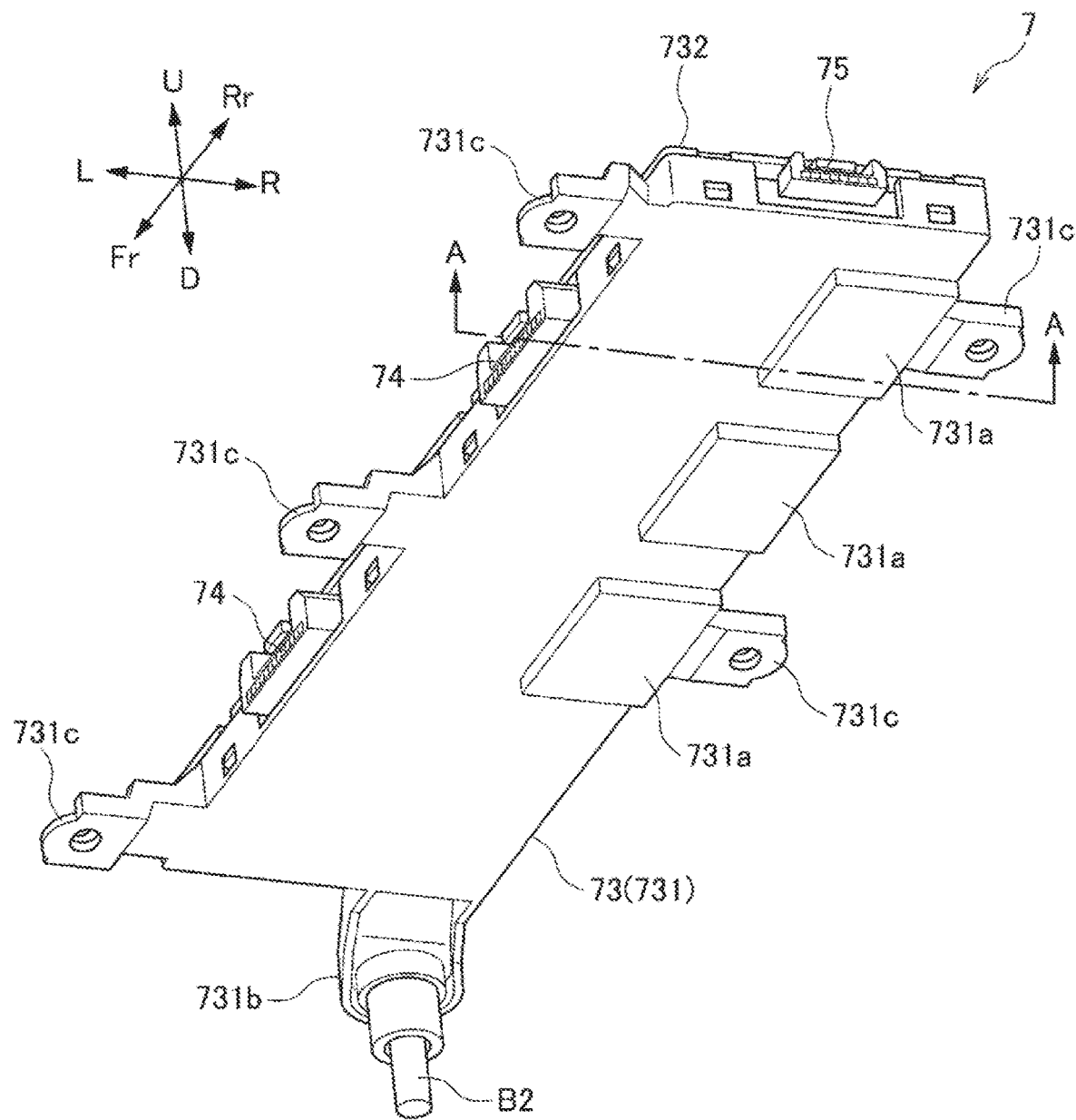
FIG. 4 is a perspective view of a sensor device of the battery module of FIG. 1 as viewed obliquely from below.
Figure 5:
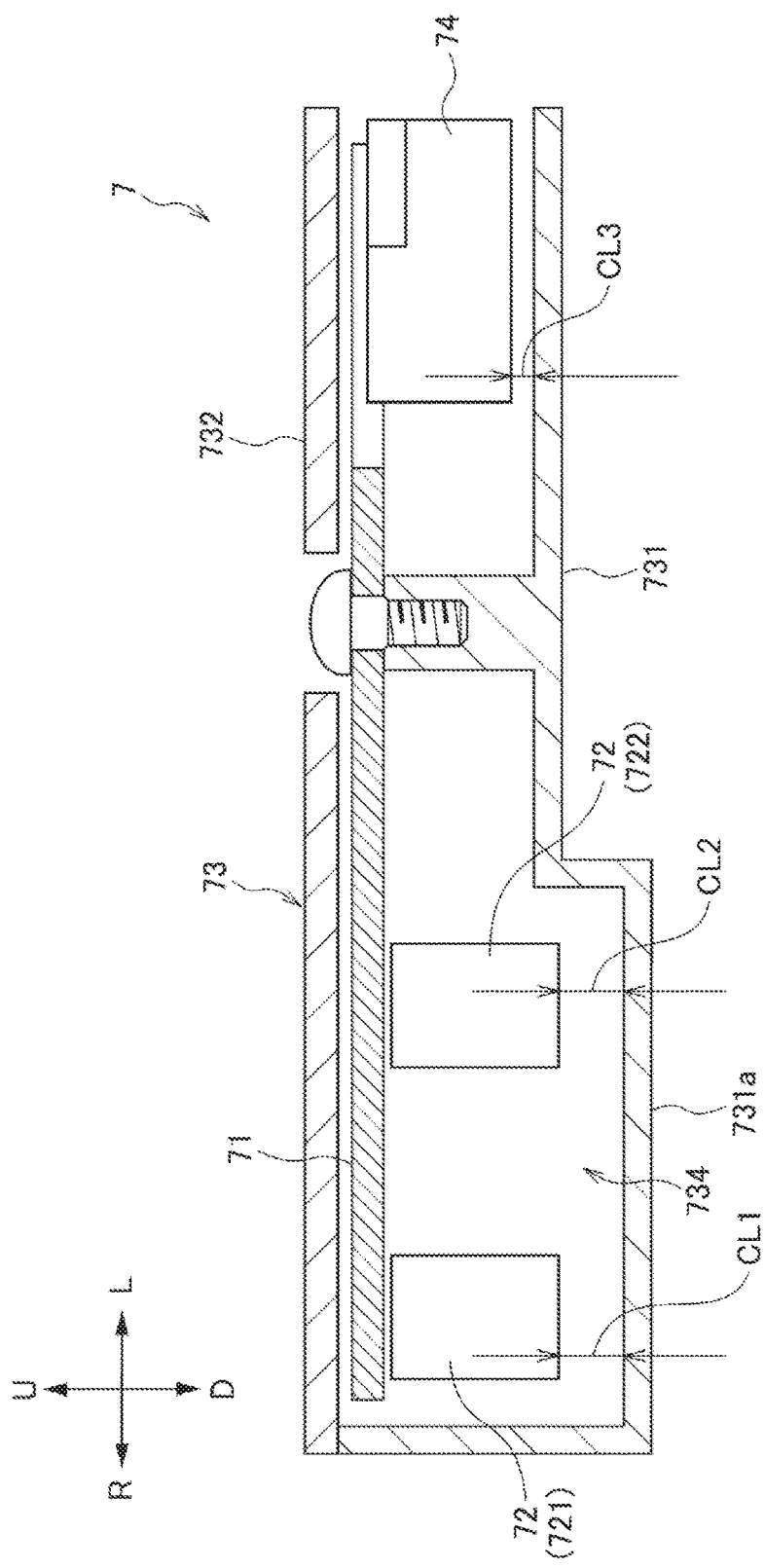
FIG. 5 is a cross-sectional view taken along the line A-A of FIG. 4.

As illustrated in FIGS. 4 and 5, the sensor device 7 includes a substrate 71, electronic components 72 mounted on the substrate 71, and a case 73 for accommodating the substrate 71 and the electronic components 72, voltage detection connectors 74 disposed on the side surfaces of the case 73 and connected to each bus bar 23 via a plurality of voltage detection lines 9, a detection signal output connector 75 disposed on the side surface of the case 73 and connected to a charge and discharge control unit (not illustrated) of a vehicle via a plurality of detection signal output lines (not illustrated). Further, the sensor device 7 of the embodiment is provided with two voltage detection connectors 74 in order to enable the voltage detection of two battery modules 1. However, the number of voltage detection connectors may be one or three or more.

The substrate 71 in the embodiment is a print substrate having a rectangular shape in plan view which is long in the front-rear direction. In the substrate 71, the wiring is printed on the upper surface thereof and the electronic components 72, the voltage detection connectors 74, and the detection signal output connector 75 are mounted on the lower surface thereof.

The electronic component 72 includes a transformer 721 and an electrolytic capacitor 722 which have relatively large height dimensions. Further, the electronic components 72 have a difference in clearances CL1 to CL3 to be secured with respect to the case 73 in accordance with the heat radiation amount and the like. For example, in a case of the voltage detection connector 74 with a small heat radiation amount, it is sufficient to secure a slight clearance CL3 with respect to the case 73. However, in the case of the transformer 721 and the electrolytic capacitor 722 having a large heat radiation amount, it is necessary to secure the clearances CL1 and CL2 larger than the clearance CL3.

The case 73 includes a case main body 731 covering the lower surface side of the substrate 71 and a lid case 732 covering an upper surface side of the substrate 71. The upper surface of the lid case 732 is formed substantially flat, whereas the lower surface of the case main body 731 is formed with a sensor bulging portion 731a which bulges downward. Within the case 73, the sensor bulging portion 731a of the embodiment constitutes an electronic component accommodation portion 734 for accommodating the transformer 721 and the electrolytic capacitor 722 which have a relatively large height and require the large clearances CL1 and CL2 with respect to the case 73. Three sensor bulging portions 731a formed in a rectangular shape in bottom view are provided at predetermined intervals in the front-rear direction.

In addition, a fixing portion 731b to be fixed to the sensor fixing portion 33 of the end plate 3 via the bolt B2 is provided at one end portion of the case main body 731 in the front-rear direction and a plurality of engaging portions 731c to be respectively engaged with the plurality of insulation plates 22 are provided in the left and right sides of the case main body 731.

The voltage detection connector 74 is connected to respective bus bar 23 via a plurality of voltage detection lines 9. One end sides of the plurality of voltage detection lines 9 are connected to the voltage detection connector 74 of the sensor device 7 through a cable-side connector. In addition, as illustrated in FIG. 3, terminal portions 92 for connecting to respective bus bars 23 are respectively provided on the other end sides of the plurality of voltage detection lines 9 and the voltage detection lines are connected to the bus bars 23 through the terminal portions 92. Specifically, the terminal portion 92 has a terminal main body 921 and a caulking portion 922 connected to the other end portion of the voltage detection line 9 by caulking and the terminal main body 921 is connected by welding or the like to terminal portion 232 provided on the bus bar 23 side.

The terminal portion 92 on the voltage detection line 9 and the terminal portion 232 on the bus bar 23 are disposed on the upper surface of the bus bar plate 24. Since the terminal main body 921 of the terminal portion 92 and the terminal portion 232 on the bus bar 23 side are formed of thin metal members, the height dimension thereof is low. However, since the caulking portion 922 of the terminal portion 92 is caulked to the voltage detection line 9, the height dimension thereof is larger than that of the terminal main body 921 of the terminal portion 92. That is, on the upper surface of the bus bar plate 24, a portion where the caulking portion 922 of the terminal portion 92 is disposed becomes a high-height portion 242 and a portion between the high-height portion 242 and the high-height portion 242 adjacent in the front-rear direction becomes a low-height portion 243. In addition, one end sides of the plurality of voltage detection lines 9 are bundled and only the other end sides are wired toward respective bus bars 23. However, a bundling portion 93 of the plurality of voltage detection lines 9 is accommodated in a voltage detection line accommodation portion 244 which is secured in an area avoiding the high-height portion 242 on upper surface of the bus bar plate 24.

(Nested Structure of Sensor Device and Cell-Stacked Body)

Next, a nested structure of the sensor device 7 and the cell-stacked body 2 will be described.

In the battery module 1 configured as described above, since the sensor device 7 is disposed on the upper portion of the cell-stacked body 2, there is a possibility that the height dimension of the battery module 1 is significantly increased. Here, in the battery module 1 according to the embodiment of the invention, the sensor bulging portion 731a bulging downward from the lower surface of the sensor device 7 is accommodated in the low-height portion 243 provided on the upper portion of the cell-stacked body 2 (bus bar plate 24). In this manner, the height dimension can be reduced by the nested structure of the sensor device 7 and the cell-stacked body 2 while the sensor module 7 is disposed on the upper portion of the cell-stacked body 2 in the battery module 1.

The sensor device 7 includes the substrate 71, the electronic components 72 mounted on the substrate 71, and the case 73 accommodating the substrate 71 and the electronic components 72. The sensor bulging portion 731a is provided on the lower surface of the case 73. Therefore, the substrate 71 and the like is protected by the case 73 accommodating the substrate 71 and the electronic components 72, and the height dimension can be reduced by the nested structure.

The electronic components 72 are mounted on the lower surface of the substrate 71 and the sensor bulging portion 731a becomes the electronic component accommodation portion 734 for accommodating the electronic components 72. Therefore, the size of the sensor device 7 can be reduced by making only the outer wall of the electronic component accommodation portion 734, which requires height, bulged to form the sensor bulging portion 731a.

Also, since the low-height portion 243 is configured by the bus bar plate 24 mounted on the upper surface of the cell-stacked body 2, the height of the sensor bulging portion 731a can be absorbed by using the concavo-convex structure of the bus bar plate 24.

The high-height portion 242 of the bus bar plate 24 is the caulking portion 922 provided at the terminal portion 92 of the voltage detection line 9 connected to the bus bar 23 and the low-height portion 243 is provided between the caulking portions 922. Therefore, although the height of the caulking portion 922 connecting the voltage detection line 9 and the terminal portion 92 by caulking becomes high, the height of the sensor bulging portion 731a can be absorbed by using the low-height portion 243 avoiding the caulking portion 922 of the terminal portion 92.

The other end sides of the plurality of the voltage detection lines 9 are connected to the bus bars 23 and one end sides are bundled and pass through the space between the lower surface of the sensor device 7 and the upper surface of the bus bar plate 24. The one end sides of the plurality of the voltage detection lines 9 is pulled out from the space and connected to the voltage detection connector 74 of the sensor device 7. However, in the bus bar plate 24, the voltage detection line accommodation portion 244 is provided at a position not overlapping with the high-height portion 242, and the bundling portion 93 of the plurality of voltage detection lines 9 is accommodated in the voltage detection line accommodation portion 244. Therefore, the voltage detection line accommodation portion 244 is prevented from bulging upward, and thus the height of the battery module 1 can be reduced.

In the embodiment described above, modifications, improvements, and the like can be made as appropriate. For example, in the embodiment described above, the sensor bulging portion 731a is provided in the case 73 of the sensor device 7. However, the electronic component 72 mounted on the substrate 71 may be the sensor bulging portion. Also, in the embodiment described above, the high-height portion 242 and the low-height portion 243 are configured by the bus bar plate 24. However, the high-height portion and the low-height portion may be configured by a member other than the bus bar plate 24 as long as the member is a component of the cell-stacked body 2.

[Summary]

At least the following matters are described in this description. In addition, constituent components or the like corresponding to the embodiment described above are described in parenthesis, but are not limited thereto.

(1) A battery module (battery module 1) including:
a cell-stacked body (cell-stacked body 2) constituted by stacking a plurality of cells (cells 21); and
a sensor device (sensor device 7) configured to detect a voltage of each cell, in which
the sensor device is disposed on an upper portion of the cell-stacked body,
the sensor device is provided with a sensor bulging portion (sensor bulging portion 731a) which bulges downward, and
the upper portion of the cell-stacked body is provided with a low-height portion (low-height portion 243) accommodating the sensor bulging portion.

According to (1), the height dimension of the battery module can be restricted by the nested structure of the cell-stacked body and the sensor device while the sensor device is disposed on the upper portion of the cell-stacked body in the battery module.

(2) The battery module according to (1), in which the sensor device includes:
a substrate (substrate 71);
an electronic component (electronic components 72) mounted on the substrate; and
a case (case 73) accommodating the substrate and the electronic component, and
the sensor bulging portion is provided on a lower surface of the case.

According to (2), by accommodating the substrate and the electronic component in the case, the height dimension can be reduced by the nested structure while the substrate and the like are protected by the case.

(3) The battery module according to (2), in which the electronic component is mounted on a lower surface of the substrate, and
the sensor bulging portion is an electronic component accommodation portion which accommodates the electronic component.

According to (3), the size of the sensor device can be reduced by making only the outer wall of the electronic component accommodation portion, which requires height, bulged to form the sensor bulging portion.

(4) The battery module according to any one of (1) to (3), in which
the battery module further comprises a bus bar plate (bus bar plate 24) mounted on an upper surface of the cell-stacked body, and
the low-height portion is constituted by the bus bar plate.

According to (4), the height of the sensor bulging portion can be absorbed by using the concavo-convex structure of the bus bar plate.

(5) The battery module according to (4), in which the bus bar plate includes:
high-height portions (high-height portions 242) which are terminal portions (terminal portions 92) of voltage detection lines (voltage detection lines 9) connected to bus bars (bus bars 23); and
the low-height portion provided between the terminal portions.

According to (5), although the height of the terminal portions of the voltage detection lines becomes high because the terminal is crimped to the wire, the height of the sensor bulging portion can be absorbed by using the low-height portion avoiding the terminal portions of the voltage detection lines. (6) The battery module according to (5), in which the bus bar plate further includes a voltage detection line accommodation portion (voltage detection line accommodation portion 244) accommodating a plurality of the voltage detection lines at a position which does not overlap with the high-height portion.

According to (6), the voltage detection line accommodation portion can be prevented from bulging upward.

The invention claimed is:

1. A battery module comprising:
a cell-stacked body constituted by stacking a plurality of cells;
a sensor device configured to detect a voltage of each cell; and
a bus bar plate mounted on an upper surface of the cell-stacked body, wherein
the sensor device is disposed on an upper portion of the cell-stacked body,
the sensor device is provided with a plurality of sensor bulging portions which bulges downward,
the upper portion of the cell-stacked body is provided with a plurality of low-height portions provided on a single flat plate, each low-height portion being recessed downwards to accommodate a respective one of the sensor bulging portions, and
the low-height portions are constituted by the bus bar plate.

2. The battery module according to claim 1, wherein the sensor device includes:
a substrate;
electronic components mounted on the substrate; and
a case accommodating the substrate and the electronic component, and
the sensor bulging portions are provided on a lower surface of the case.

3. The battery module according to claim 2, wherein the electronic component is mounted on a lower surface of the substrate, and
the sensor bulging portions are electronic component accommodation portions which accommodate the electronic components.

4. The battery module according to claim 1, wherein the bus bar plate includes:
high-height portions which are terminal portions of voltage detection lines connected to bus bars and which extend upwards; and
the low-height portions are provided between the terminal portions.

5. The battery module according to claim 4, wherein the bus bar plate further includes a voltage detection line accommodation portion accommodating a plurality of the voltage detection lines at a position which does not overlap with the high-height portions.

6. The battery module according to claim 1, wherein the plurality of low-height portions are provided on a same plane that is parallel to the upper surface of the cell-stacked body.

7. The battery module according to claim 1, wherein each low-height portion is recessed downwards by a first depth amount to accommodate the respective one of the sensor bulging portions.

8. The battery module according to claim 4, wherein the high-height portions extend upwards by a first height amount.

* * * * *